United States Patent

Brewer et al.

[11] Patent Number: 6,151,892
[45] Date of Patent: Nov. 28, 2000

[54] INTERNAL COMBUSTION ENGINE WITH PROGRAMMED WATER INJECTION INTO ITS EXHAUST SYSTEM

[75] Inventors: Daniel E. Brewer, Berlin; Jason F. Pugh, Ripon, both of Wis.

[73] Assignee: Brunswick Corporation, Lake Forest, Ill.

[21] Appl. No.: 09/323,800

[22] Filed: Jun. 1, 1999

[51] Int. Cl.[7] .................................................. F02B 27/02
[52] U.S. Cl. .................................. 60/313; 60/312; 60/314
[58] Field of Search .............................. 60/312, 313, 314

[56] References Cited

U.S. PATENT DOCUMENTS

| | | |
|---|---|---|
| 3,385,052 | 5/1968 | Holtermann et al. . |
| 3,808,807 | 5/1974 | Lanpheer . |
| 3,813,880 | 6/1974 | Reid et al. . |
| 4,014,282 | 3/1977 | Kollmann . |
| 4,920,745 | 5/1990 | Gilbert . |
| 4,941,319 | 7/1990 | Yamamoto et al. ...................... 60/314 |
| 5,378,180 | 1/1995 | Nakayama . |
| 5,746,054 | 5/1998 | Matte . |
| 5,983,633 | 11/1999 | Woleslagle et al. ...................... 60/312 |
| 6,026,641 | 2/2000 | Liberty ...................................... 60/314 |
| 6,064,198 | 5/2000 | Wolf et al. ........................... 324/207.2 |

*Primary Examiner*—Thomas Denion
*Assistant Examiner*—Diem Tran
*Attorney, Agent, or Firm*—William D. Lanyi

[57] ABSTRACT

An exhaust system for an internal combustion engine used in a marine propulsion system is provided with a water injection system by which water can be injected into the exhaust system. An engine control unit, which comprises a micro-processor, is used to select the rate of water injection into the exhaust system as a function of several predefined parameters. For example, engine speed and throttle position can be used by the micro-processor in the engine control unit to select a predefined rate of water flow into the exhaust system by selecting a predefined valve position, for an electronically controlled valve, that has been preselected and stored in the micro-processor.

14 Claims, 4 Drawing Sheets

INTERNAL COMBUSTION ENGINE WITH PROGRAMMED WATER INJECTION INTO ITS EXHAUST SYSTEM

BACKGROUND OF THE INVENTION

1. Field of the Invention

The present invention is generally related to injection of water into an exhaust system and, more particularly, a method by which a micro-processor controls the injection of predetermined amounts of water into an exhaust system based one or more conditions relating to the operation of the internal combustion engine.

2. Description of the Prior Art

It is well know that certain operational advantages can be achieved by injecting water into the exhaust system of an internal combustion engine. This concept is described in detail in U.S. Pat. No. 3,385,052, which issued to Holterman et al on May 28, 1968. The exhaust system described is operated according to a method which comprises the steps of discharging burned gases from a combustion chamber through an exhaust port to an exhaust passage in order to obtain timed return of a pressure wave to the exhaust port by injecting a liquid into the burned gases discharged from the combustion chamber. Also disclosed is an internal combustion engine having a means for timing the return to an exhaust port of a pressure wave in an exhaust passageway, including means for supplying a cooling liquid to the passageway. The engine includes an exhaust passageway which increases an internal cross section in the direction away from the exhaust port and terminates in a wall that is transversed to that direction. The passageway also includes a means for defining an opening which is located adjacent to the wall and which has a relatively small area as compared to the area of the wall.

U.S. Pat. No. 3,813,880, which issued to Reid et al on Jun. 4, 1974, discloses an exhaust tuning system for a two stroke engine. The engine includes a pair of exhaust chambers having a common control wall and each of which is connected between a corresponding plurality of selected cylinders and a common exhaust passageway. The connection between each of the chambers and the passageway is defined by a tuning section which is constructed of sufficient length and a configuration to generate a negative pressure pulse to aid scavenging and reflected positive pulses from the fired cylinder. In addition, the next fired cylinder of each group establishes a super-charging of the engine. The common wall between the two tuned passageways is provided with a transfer port for transferring of a positive pressure signal from the one passageway into the opposite passageway which travels back toward the engine to provide a further positive super-charging pulse to the opposite exhaust chamber. The feedback pressure wave can be applied with a particular advantage to four and two cylinder engines.

U.S. Pat. No. 5,746,054, which issued to Matte on May 5, 1998, describes a method and apparatus for a tuned pipe water injection. In an exhaust expansion chamber or tuned pipe of a two-cycle engine in a watercraft, variable amounts of water are injected, thus cooling the temperature within the expansion chamber and matching the sonic wave speed with that of the correct rpm of the motor. Thus, by regulating the temperature of the exhaust gases in the tuned pipe with water, the efficiency of the two-cycle engine at varying revolutions per minute is improved.

U.S. Pat. No. 4,014,282, which issued to Kollman on Mar. 29, 1977, discloses an exhaust tube mounting apparatus for outboard motors. In an outboard motor, the engine exhausts through the drive shaft housing in which an exhaust tube directs the gases into a lower propeller unit secured to the housing. The exhaust tube has support legs on the opposite top sides. Bushings encircle each lug and they rest in receptacles on the upper interior portions of the housing. An adapter plate is secured to the housing, clamps the lugs in place and moves the lower end of the tube into sealing relationship within a lower bushing within the housing. The lower bushing is a rubber-like annular bushing having a projecting ledge aligned with the lower end of the exhaust tube. The inner wall of the bushing has an inwardly and downwardly extended lop deflected and sealing with the side of the exhaust tube.

U.S. Pat. No. 3,808,807, which issued to Lanpheer on May 7, 1974, discloses a tuning arrangement for an outboard motor. The improvement in the exhaust system for a two cycle engine comprises one or more sets of three cylinders connected to the crankshaft 120° apart, the exhaust ports of which communicate with a common exhaust chamber formed in association with the cylinder block. A diverging passage leading from the common exhaust chamber to a spacious exhaust tube enclosed within the drive shaft housing produces a negative pressure from the cylinder's exhaust pulse, which negative pressure aids in scavenging the cylinder. The geometry of the diverging passage and the exhaust tube are such that a positive pulse is created by the exit of the negative pulse from said diverging passage and propagates back through the diverging passages arriving at the exhaust ports of the cylinder simultaneously with a positive pulse from a subsequently fired cylinder to aid in supercharging.

U.S. Pat. No. 4,920,745, which issued to Gilbert on May 1, 1990, describes an internal combustion engine which has a transfer port and an exhaust port in a cylinder which are opened and closed in a timed relationship by the reciprocating movement of a piston. The exhaust port communicates with an exhaust passage that is tuned to provide a pressure pattern in the exhaust passageway that will create at the exhaust port a predetermined pressure pattern while the exhaust port is opened. Coolant is supplied to the exhaust passage when the engine is subject to increasing transient load conditions, at engine speed below the tuned speed, and at a controlled rate to establish a tuned state in the exhaust passage during the transient condition.

U.S. Pat. No. 5,378,180, which issued to Nakayama et al on Jan. 3, 1995, describes an exhaust system for outboard motors which have exhaust pipes and expansion chambers into which the exhaust pipes extend. A catalyst is positioned in the exhaust system downstream of the point where the exhaust pipe terminates in the expansion chamber so as to preclude interference with the exhaust timing. The catalyst bed is removable for ease of servicing without necessitating removal of the outboard motor from its attachment to the associated watercraft and a trap device is provided for precluding water from entering the engine through its exhaust ports.

All of the patents described above are hereby expressly incorporated in the following description.

As described above, it is well known that exhaust systems can be tuned to advantageously time the arrival of reflected pressure waves at the exhaust port of a cylinder. This is done for several reasons which are all well known to those skilled in the art. Proper tuning of the exhaust system can produce super charging within the combustion chambers of the engine. These techniques are also advantageous in preventing certain quantities of unburned hydrocarbons from being exhausted through the exhaust ports following a combustion event within the combustion chamber. The advantageous effect of this procedure is obtained by changing the temperature of the exhaust gases. The speed of sound is affected by the temperature within the exhaust system and, as a result, the effective length of the exhaust pipe is changed by changing the speed at which the pressure pulses move within the exhaust pipe. By cooling the exhaust gases, the speed of the pressure pulses is slowed. This has the effect of increasing the effective length of the exhaust pipe. At different speeds of engine operation, it would be theoretically advantageous to actually have different lengths of exhaust pipe. This being impractical, it has been discovered that changes in temperature of the exhaust gases has the same affect as dynamically changing the length of the exhaust pipe.

In the prior art, many different techniques have been applied to control the rate at which water is injected into the exhaust pipe for these purposes of changing the speed of sound within the exhaust system. Certain mechanical systems, such as pressure responsive valves, have been used to change the rate at which water is injected into the exhaust system as a function of engine condition.

It would be significantly advantageous if a system could be developed in which the amount of water injected into an exhaust system could be accurately controlled, not only as a function of engine speed and/or throttle position, but also as a function of the natural operating characteristics of the engine. In other words, certain engines require different amounts of injected water at various speeds than other engines do at those same speeds. In addition, different lengths of exhaust pipes are used with different engines and, therefore, the rate of water injection into the exhaust system is a function of engine speed and/or throttle position is different for each engine type and exhaust pipe length.

SUMMARY OF THE INVENTION

The present invention is directed to solve a long standing problem toward which many different techniques have previously been applied. It is intended to provide a way in which water can be injected into an exhaust system with increased preciseness to account for engine speed, throttle position, and other engine characteristics so that the proper amount of water injection can be applied under various operating conditions to maximize the performance of the engine.

An apparatus for improving the operation of an internal combustion engine made in accordance with the present invention comprises an exhaust system having an exhaust pipe. It also comprises a water pump for pumping water through a first water conduit. A second conduit is connected in fluid communication between the first conduit and the exhaust system. An electrically controlled valve is connected to the second conduit for selectively allowing water to pass through the second conduit from the first conduit to the exhaust system. An engine control unit comprising a micro-processor is connected in signal communication with the electrically controlled valve.

A preferred embodiment of the present invention further comprises a RPM measuring sensor, such as a tachometer or a gear tooth sensor, and the RPM measuring sensor provides a first signal output. A first input of the micro-processor is connected in signal communication with the first signal output of the RPM measuring sensor. The micro-processor controls the degree to which the electrically controlled valve allows water to pass through the second conduit from the first conduit to the exhaust system as a function of the RPM of the internal combustion engine.

The micro-processor can contain a numerical table which stores a desired valve position for each of a plurality of engine speeds. In addition, the micro-processor could calculate a desired valve position for each of a plurality of engine speeds based on a predetermined mathematical relationship.

The present invention can further comprise a throttle position sensor providing a second signal output and a second input to the micro-processor can be connected in signal communication with the second signal output of the throttle position sensor. As a result, the micro-processor can control the degree to which the electrically controlled valve allows water to pass through the second conduit from the first conduit to the exhaust system as a function of both the rpm of the internal combustion engine and the throttle position of the internal combustion engine.

The present invention can be used in conjunction with the internal combustion engine of an outboard motor or a marine propulsion system comprising a stern drive unit.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
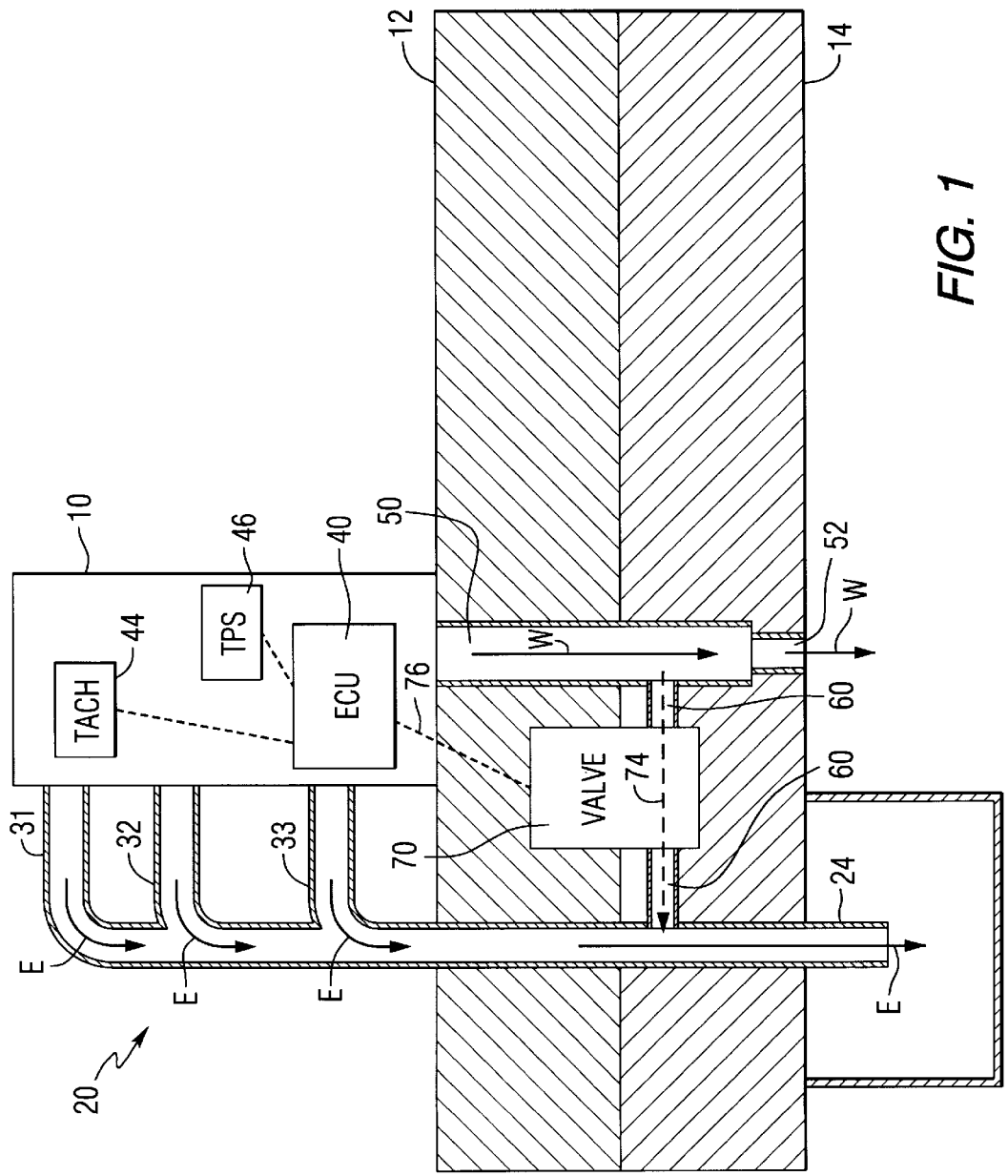
FIG. 1 is a simplified representation of an engine, an exhaust system, and a water flow system, and a water flow path for cooling water of the engine.

Throughout the description of the preferred embodiment of the present invention, like components will be identified by like reference numerals.

FIG. 1 is a highly schematic illustration which shows relative positions of an engine 10 and two adapter plates, 12 and 14. It should be understood that the components in FIG. 1 are not drawn to scale.

The engine has an exhaust system 20 which connects the exhaust ports of three cylinders in fluid communication with a main exhaust pipe 24. Individual pipes, 31–33, connect the engine 10 to the exhaust pipe 24 which, in turn, exhausts the gases into an expansion chamber 36. Arrows E represent the passage of exhaust gases from the engine 10 through the exhaust pipe 24 and into the expansion chamber 36. Many different configurations of exhaust pipes and expansion chambers are well known to those skilled in the art and have been applied to outboard motors.

With continued reference to FIG. 1, the engine 10 is provided with an engine control unit 40 which typically comprises a micro-processor that receives inputs from various sensors and provides outputs that control the operation of the engine 10. In FIG. 1, the engine control unit 40 is shown being connected to an RPM measuring sensor such as a tachometer 44 and a throttle position sensor 46. These two sensors, 44 and 46, provide signal outputs that are connected to inputs of the engine control unit 40. This is represented by dashed lines in FIG. 1.

Although the water pump is not shown in FIG. 1, it is well known to those skilled in the art that water cooled internal combustion engines require a continuous flow of water through cooling channels of the engine. This is typically accomplished by providing a water pump that is driven by an output shaft of the engine and which draws water from a body of water in which the marine propulsion unit is operated. The water is drawn from the body of water by the water pump and caused to flow through cooling channels of the engine. After cooling the engine, the water is then expelled back to the body of water in which the marine propulsion unit is operating. In FIG. 1, the first conduit 50 is connected in fluid communication with the cooling system of the engine 10 and the water passes in the direction represented by arrows W back toward the body of water in which the watercraft is operated. The first conduit 50 is provided with a restriction portion 52 which maintains a pressure within the first conduit 50 as a result of the pumping by the water pump and the restriction 52 at the exit portion of the first conduit 50. The present invention provides a second conduit 60 that is connected in fluid communication between the first conduit 50 and the exhaust system 20. An electrically controlled valve 70 is connected to the second conduit 60 for selectively allowing water to pass through the second conduit 60 from the first conduit 50 to the exhaust system 20. This selectively controlled passage of water flows in the direction represented by dashed line arrow 74. The engine control unit 40 controls the operation of the electrically controlled valve 70, as represented by dashed line 76.

In a preferred embodiment of the present invention, the engine control unit 40 receives information, relating to the speed of the engine 10, from the RPM measuring sensor 44. In certain embodiments of the present invention, the engine control unit 40 also receives information relating to the throttle position from the throttle position sensor 46. Based on one or both of these inputs, the engine control unit selects a desired rate of water flow from the first conduit 50 to the exhaust system 20 through the second conduit 60. This flow is represented by dashed line 74 in FIG. 1. In a preferred embodiment of the present invention, a look-up table is used in which each predefined range of engine speeds is associated with a specific valve position that results in a particular water flow between the first conduit 50 and the exhaust system 20. This provides a preselected rate of cooling of the exhaust gases based on the engine speed and/or throttle position. If only the engine speed is used for these purposes, a one dimensional array can contain the various valve positions associated with the predefined engine speed ranges. Alternatively, if both engine speed and throttle position are used for these purposes, a two dimensional array, or MAP, can be stored in the micro-processor in which individual predefined ranges of engine speed and throttle position can be used to identify a specific valve position that is associated with that particular combination of engine speed and throttle position. These data storage techniques are known to those skilled in the art and have been used for many different purposes.

In operation, the engine control unit 40 receives the engine speed signal from the RPM measuring sensor 44, receives the throttle position signal from the throttle position sensor 46, selects a predefined valve position for the valve 70, and then provides an output signal on line 76 to the valve 70 which sets the valve at that valve position to allow the predetermined magnitude of water flow through the second conduit 60 into the exhaust system 20.

The primary advantage of the present invention is that it accurately selects the water flow through the second conduit 60 in a way that is unachievable through methods known to those skilled in the art which are disclosed in the prior art. The advantage of the present invention is the accuracy with which the valve positions can be preselected.

It is anticipated that, in a typical application of the present invention, the engine will be empirically tested under various conditions and under various engine speeds and throttle positions. For each of these combinations, an optimal water flow magnitude through the second conduit 60 could be empirically determined. Then each of these many predefined magnitudes would be stored in a table within the engine control unit 40 so that the engine control unit 40 can select the optimal water flow through the second conduit 60 for each combination of the defined parameters, such as engine speed and throttle position. The storage in the table and the application by the engine control unit 40 allows for a preciseness of water flow application previously unobtainable in known internal combustion engine systems.

Figure 2:
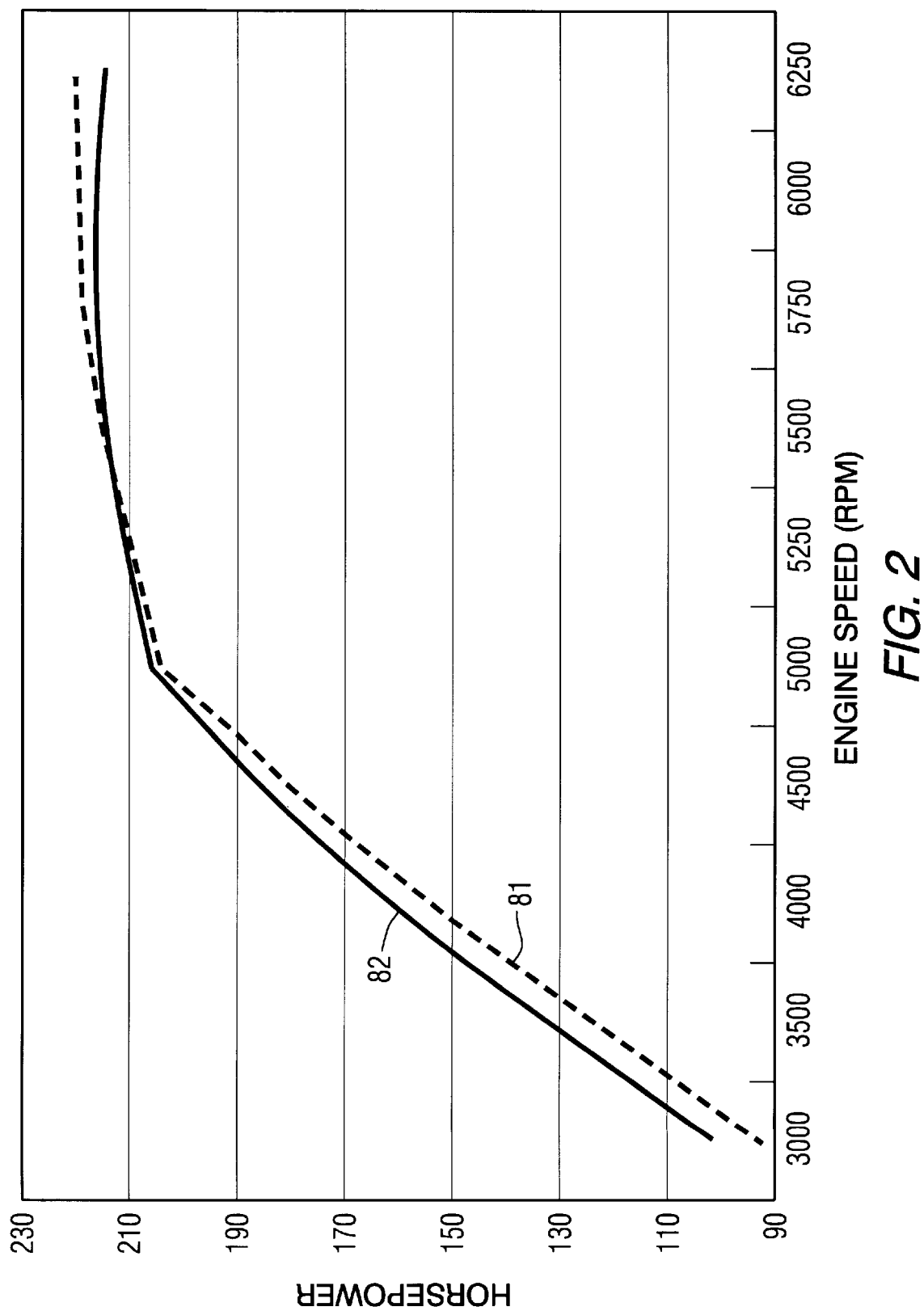
FIG. 2 is a graphical representation of the power of an outboard motor operated both with and without water injection into the exhaust system.

To illustrate the advantage of the present invention, FIG. 2 is a graphical representation of the actual power provided by an outboard motor, at various engine speeds, for both a standard engine and an engine with water injected into the exhaust system 20. Dashed line 81 represents the horsepower measured during an empirical test of an outboard engine at various speeds ranging from 3,000 rpm to 6,250 rpm. Solid line 82 represents a similar test, but one that provided for water injection into the exhaust system 20 of the same engine. As can be seen, the horsepower of the engine is dramatically increased at the lower engine speeds, from 3,000 rpm to approximately 5,000 rpm. As can be seen in FIG. 2, valuable horsepower can be added to the outboard motor during initial acceleration at low speeds if water is injected appropriately into the exhaust system 20.

Figure 3:
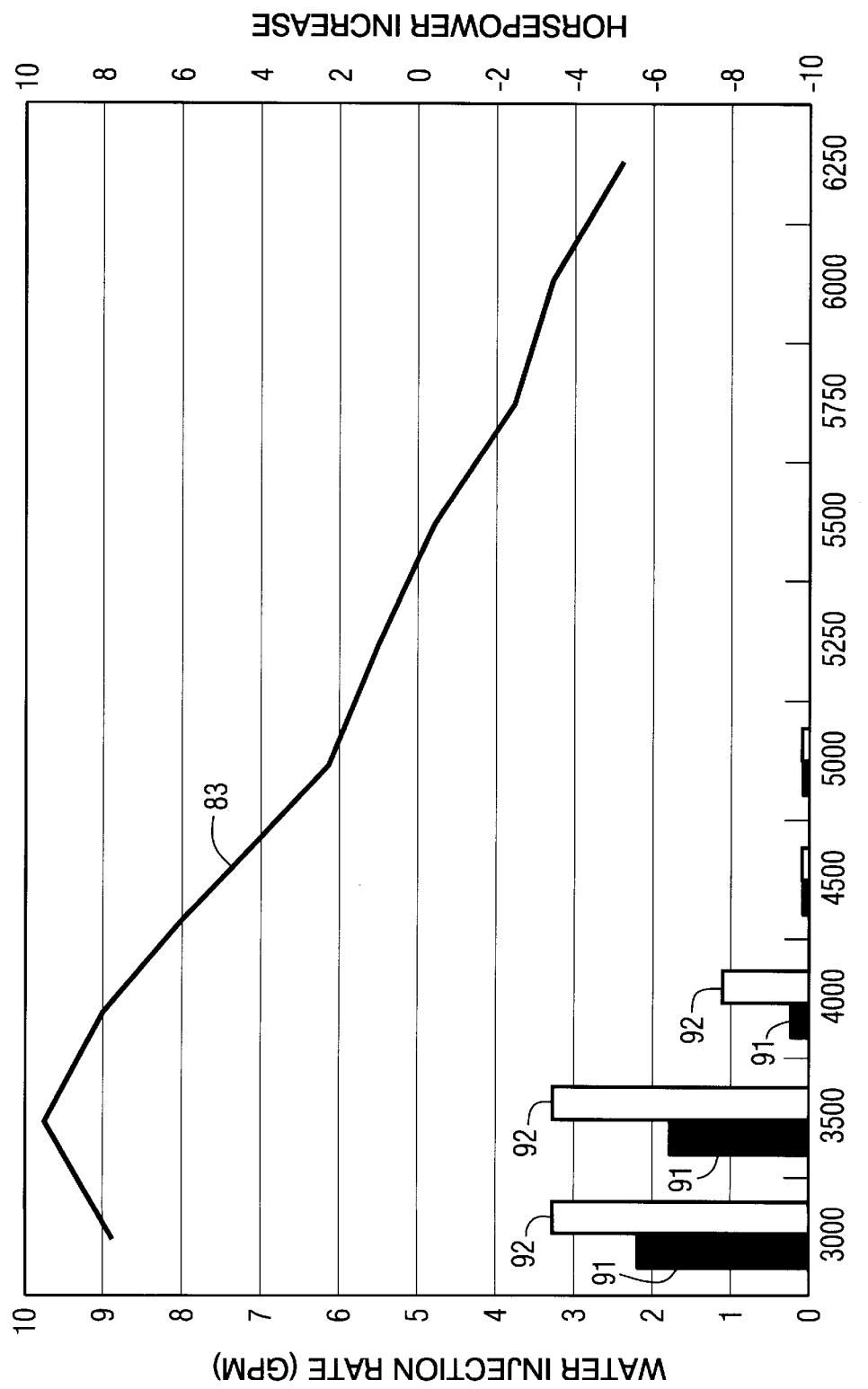
FIG. 3 shows the difference in horsepower between the operation of an outboard motor with and without water injection into the exhaust system and also illustrates the approximate magnitude of water injected into the exhaust system during the tests represented by FIGS. 2 and 3.
Figure 4:
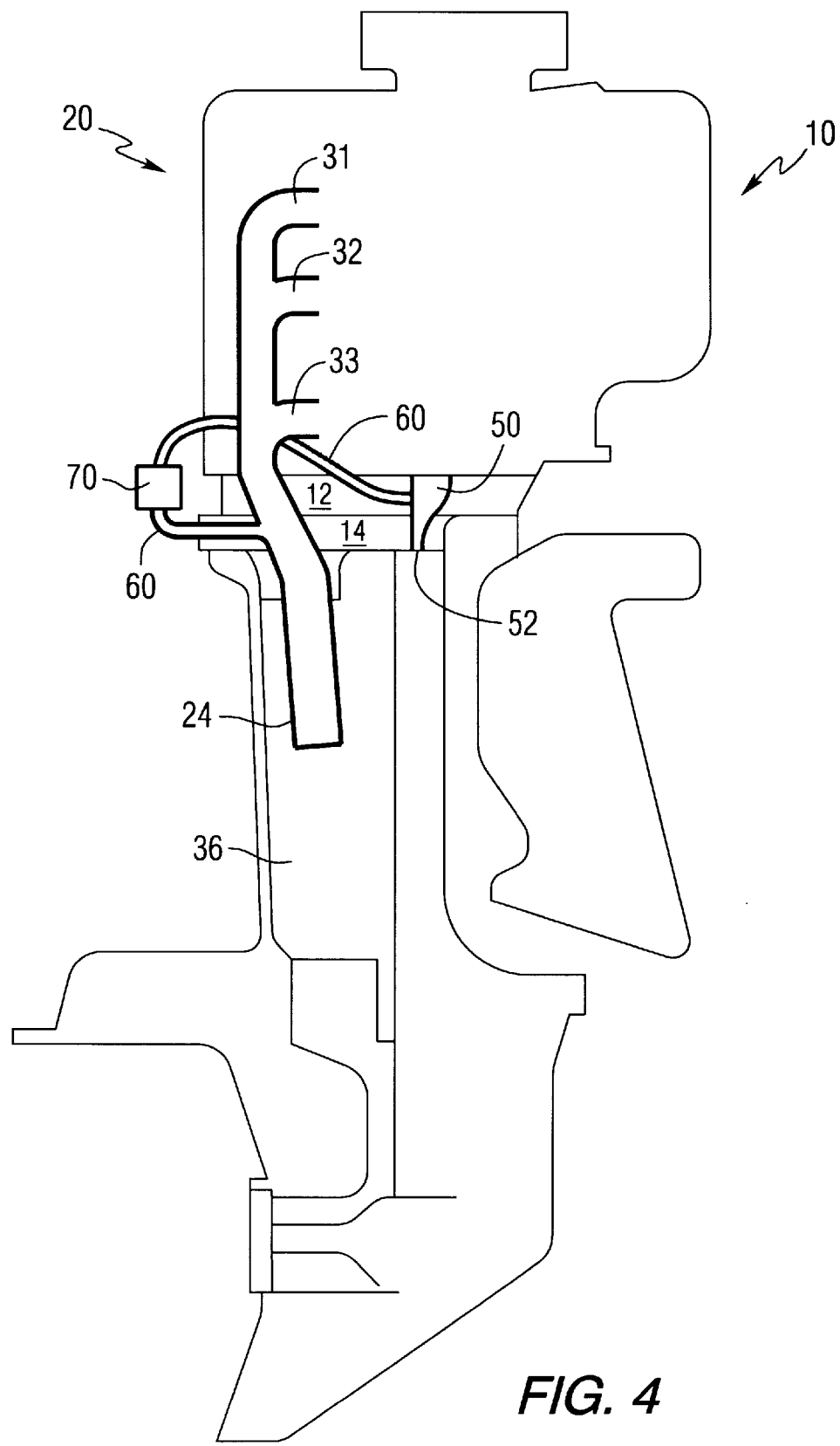
FIG. 4 shows the present invention configured with an outboard motor which is shown in silhouette.

FIG. 3 is related to the tests used to provide the data in FIG. 2, but shows the actual improvement, in horsepower, that the various engine speeds used in the empirical test. Line 83 in FIG. 3, measured against the right vertical axis in FIG. 3, shows the increase in horsepower of line 82 in FIG. 2 compared to line 81. As can be seen, the line 83 in FIG. 3 provides a significant horsepower increase at speeds below approximately 5,250 rpm. The vertical bars in FIG. 3 represent the water injection, in gallons per minute, used during the test. It should be realized that the data relating to the water injection was determined in a manner that did not permit the water injection rate to be determined with extreme preciseness. Instead, the black bars 91 in FIG. 3 represent the low limit of a range of water injection rate at each of the identified engine speeds and the white bars 92 represent the high limit of water injected at those same speeds. However, the bars in FIG. 3 show that more water was injected at the extremely low engine speeds than at the higher engine speeds. It is intended that the rate of water injection would be higher at low speeds in a preferred embodiment of the present invention. The reason for this is that most engines would typically be tuned with an exhaust pipe 24 of a relatively short length that most closely maximizes the operation of the engine at wide open throttle (WOT). Therefore, at higher engine speeds, water injection is not needed for the purpose of increasing the effective length of the exhaust pipe 24. However, since the exhaust pipe is a fixed physical length, the water injection would typically be used at lower speeds in order to slow the speed of sound of the pressure pulses and, in effect, lengthen the shortened exhaust pipe 24 at those lower speeds. This would allow increased power to be provided by the engine at the low speeds and, as a result, would result in significant improvement in acceleration from a standing condition to a top speed condition. This improved horsepower and acceleration would provide a significant benefit in moving a watercraft from a standing position to a planing condition. FIG. 4 shows an outboard motor, shown in silhouette, to illustrate where the engine 10 and exhaust system 20 are located. The individual pipes, 31–33, connect the engine 10 to the exhaust pipe 24. The exhaust pipe exhausts the gases into the expansion chamber 36. Also shown are the two adapter plates, 12 and 14, and the first conduit 50 which extends through the adapter plates. The restriction portion 52 is shown at the bottom portion of the first conduit 50. The second conduit 60 connects the valve 70 with the first conduit 50 and also connects the valve 70 with the exhaust pipe 24. It can be seen that the arrangement in FIG. 4 is slightly different from the arrangement in FIG. 1 since the valve 70 and the second conduit 60 are both externally located with respect to the adapter plates, 12 and 14.

It should be understood that the highly schematic embodiment of FIG. 1 and the embodiment shown in FIG. 4 both incorporate the concepts of the present invention. The basic advantage of the present invention is that an engine control unit (not shown in FIG. 4) controls the electrically controlled valve, as a function of engine speed, so that the microprocessor of the engine control unit can control the degree to which the electrically controlled valve allows water to pass through the second conduit from the first conduit to the exhaust system as a function of the speed of the internal combustion engine. This arrangement, shown schematically in FIG. 1 and also in FIG. 4, allows a significantly improved degree of accuracy in the rate at which water is provided to the exhaust system in order to more accurately and effectively tune the exhaust system.

Although the present invention has been described to illustrate a particularly preferred embodiment, it should be understood that alternative embodiments are also within its scope.

What is claimed is:

1. An apparatus for improving the operation of an internal combustion engine of an outboard motor, comprising:

an exhaust system having an exhaust pipe;

a water pump for pumping water through a first conduit;

an adapter plate member attached to said internal combustion engine, said exhaust pipe extending through said adapter plate member, said first conduit extending through said adapter plate member;

a second conduit connected in fluid communication between said first conduit and said exhaust system, said second conduit being contained within said adapter plate member;

an electrically controlled valve connected to said second conduit for selectively allowing water to pass through said second conduit from said first conduit to said exhaust system;

an engine control unit comprising a microprocessor connected in signal communication with said electrically controlled valve;

an RPM measuring sensor providing a first signal output; and a first input of said microprocessor connected in signal communication with said first signal output of said RPM measuring sensor, said microprocessor controlling the degree to which said electrically controlled valve allows water to pass through said second conduit from said first conduit to said exhaust system as a function of the RPM of said internal combustion engine.

2. The apparatus of claim 1, wherein:

said RPM measuring sensor is a tachometer.

3. The apparatus of claim 1, wherein:

said electrically controlled valve is disposed within a cavity formed within said adapter plate member.

4. The apparatus of claim 1, wherein:

said microprocessor contains a numerical table which stores a desired valve position for each of a plurality of engine speeds.

5. The apparatus of claim 1, wherein:

said microprocessor calculates a desired valve position for each of a plurality of engine speeds based on a predetermined mathematical relationship.

6. The apparatus of claim 1, further comprising:

a throttle position sensor providing a second signal output; and a second input of said microprocessor connected in signal communication with said second signal output of said throttle position sensor, said microprocessor controlling the degree to which said electrically controlled valve allows water to pass through said second conduit from said first conduit to said exhaust system as a function of the RPM of said internal combustion engine and the throttle position of said internal combustion engine.

7. The apparatus of claim 6, wherein:

said microprocessor contains a numerical table which stores a desired valve position for each of a plurality of engine speeds and throttle positions.

8. The apparatus of claim 6, wherein:

said microprocessor calculates a desired valve position for each of a plurality of engine speeds based on a predetermined mathematical relationship.

9. An apparatus for improving the operation of an internal combustion engine of an outboard motor, comprising:

an exhaust system having an exhaust pipe;

a water pump for pumping water through a first conduit;

an adapter plate member, comprising a first adapter plate and a second adapter plate, attached to said internal combustion engine, said exhaust pipe extending through said adapter plate member, said first conduit extending through said adapter plate member;

a second conduit connected in fluid communication between said first conduit and said exhaust system, said second conduit being contained within said adapter plate member;

an electrically controlled valve connected to said second conduit for selectively allowing water to pass through said second conduit from said first conduit to said exhaust system;

an engine control unit comprising a microprocessor connected in signal communication with said electrically controlled valve;

an RPM measuring sensor providing a first signal output;

a first input of said microprocessor connected in signal communication with said first signal output of said RPM measuring sensor;

a throttle position sensor providing a second signal output; and a second input of said microprocessor connected in signal communication with said second signal output of said throttle position sensor, said microprocessor controlling the degree to which said electrically controlled valve allows water to pass through said second conduit from said first conduit to said exhaust system as a function of the RPM of said internal combustion engine and the throttle position of said internal combustion engine, said microprocessor containing a numerical table which stores a desired valve position for each of a plurality of engine speeds and throttle positions.

10. The apparatus of claim 9, wherein:

said electrically controlled valve is disposed within a cavity formed within said first and second adapter plates of said adapter plate member.

11. The apparatus of claim 9, wherein:

said RPM measuring sensor is a gear tooth sensor.

12. An apparatus for improving the operation of an internal combustion engine of an outboard motor, comprising:

an exhaust system having an exhaust pipe;

a water pump for pumping water through a first conduit;

a second conduit connected in fluid communication between said first conduit and said exhaust system;

an electrically controlled valve connected to said second conduit for selectively allowing water to pass through said second conduit from said first conduit to said exhaust system;

an adapter plate member, comprising a first adapter plate and a second adapter plate, attached to said internal combustion engine, said exhaust pipe extending through said adapter plate member, said first conduit extending through said adapter plate member, said second conduit being contained within said adapter plate member said electrically controlled valve being disposed within a cavity formed within said first and second adapter plates of said adapter plate member;

an engine control unit comprising a microprocessor connected in signal communication with said electrically controlled valve;

an RPM measuring sensor providing a first signal output;

a first input of said microprocessor connected in signal communication with said first signal output of said RPM measuring sensor;

a throttle position sensor providing a second signal output; and a second input of said microprocessor connected in signal communication with said second signal output of said throttle position sensor, said microprocessor controlling the degree to which said electrically controlled valve allows water to pass through said second conduit from said first conduit to said exhaust system as a function of the RPM of said internal combustion engine and the throttle position of said internal combustion engine, said microprocessor containing a numerical table which stores a desired valve position for each of a plurality of engine speeds and throttle positions, said internal combustion engine being part of an outboard motor.

13. The apparatus of claim 12, wherein:

said RPM measuring sensor is a tachometer.

14. The apparatus of claim 12, wherein:

said RPM measuring sensor is a gear tooth sensor.

* * * * *